(12) United States Patent
Mano (10) Patent No.: US 10,184,511 B2
(45) Date of Patent: Jan. 22, 2019

(54) LINKAGE WITH SPHERICAL OR JOURNAL BEARING ASSEMBLY

(71) Applicant: United Technologies Corporation, Hartford, CT (US)

(72) Inventor: Stephen Mano, East Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 762 days.

(21) Appl. No.: 14/760,151

(22) PCT Filed: Jan. 11, 2013

(86) PCT No.: PCT/US2013/021230
§ 371 (c)(1),
(2) Date: Jul. 9, 2015

(87) PCT Pub. No.: WO2014/109760
PCT Pub. Date: Jul. 17, 2014

(65) Prior Publication Data
US 2015/0337891 A1 Nov. 26, 2015

(51) Int. Cl.
| | |
|---|---|
| *F16C 11/06* | (2006.01) |
| *F16C 9/04* | (2006.01) |
| *F01D 17/16* | (2006.01) |
| *F01D 25/16* | (2006.01) |
| *F02K 1/76* | (2006.01) |

(52) U.S. Cl.
CPC ........... *F16C 11/06* (2013.01); *F01D 17/162* (2013.01); *F01D 25/162* (2013.01); *F02K 1/763* (2013.01); *F16C 9/04* (2013.01); *F16C 11/0614* (2013.01); *F05D 2260/79* (2013.01); *F16C 2360/23* (2013.01); *Y10T 403/32631* (2015.01); *Y10T 403/32811* (2015.01)

(58) Field of Classification Search
CPC ... F16C 11/06; F16C 11/0614; F16C 11/0638; Y10T 403/32811
See application file for complete search history.

(56) References Cited

U.S. PATENT DOCUMENTS

| | | | |
|---|---|---|---|
| 2,126,388 A | 8/1938 | Hoke et al. | |
| 2,880,025 A * | 3/1959 | Herbenar | F16C 11/0604 403/133 |
| 3,659,910 A | 5/1972 | Foster | |
| 3,951,557 A * | 4/1976 | Herbenar | F16C 11/0638 403/138 |
| 3,968,975 A * | 7/1976 | Herbenar | B62D 7/22 280/89.11 |
| 3,989,321 A | 11/1976 | McCloskey | |
| 4,105,365 A | 8/1978 | Ferris et al. | |
| 4,588,355 A | 5/1986 | Ferris et al. | |
| 4,662,772 A * | 5/1987 | Schultz | B60K 20/02 403/114 |
| 4,726,694 A | 2/1988 | McFarlin et al. | |

(Continued)

*Primary Examiner* — Daniel J Wiley
(74) *Attorney, Agent, or Firm* — O'Shea Getz P.C.

(57) ABSTRACT

An assembly includes a spherical bearing race and a spherical bearing element. The bearing race includes a race first segment, a race second segment and a bore that extends along an axis into the bearing race. The bore also extends radially within the bearing race between the first segment and the second segment. The bearing element is arranged within the bore, and radially engages the first segment and the second segment.

19 Claims, 7 Drawing Sheets

(56) References Cited

U.S. PATENT DOCUMENTS

| | | | |
|---|---|---|---|
| 5,005,991 A | 4/1991 | Heumann et al. | |
| 5,066,160 A * | 11/1991 | Wood | B62D 7/166 403/132 |
| 5,393,161 A * | 2/1995 | Mata | A61B 17/6416 403/112 |
| 5,442,993 A | 8/1995 | Baliotti, II et al. | |
| 5,523,530 A | 6/1996 | Byrnes et al. | |
| 6,010,271 A * | 1/2000 | Jackson | F16C 11/0628 403/131 |
| 6,223,616 B1 | 5/2001 | Sheridan | |
| 6,422,779 B1 * | 7/2002 | Spagnuolo | B62D 3/12 280/93.511 |
| 6,520,813 B1 | 2/2003 | DeVito, Jr. | |
| 6,619,874 B2 * | 9/2003 | Paduano | F16C 11/0619 403/134 |
| 6,742,324 B2 | 6/2004 | Bachelder et al. | |
| 6,821,084 B2 | 11/2004 | Bathori et al. | |
| 7,083,356 B2 * | 8/2006 | Paduano | F16C 11/0604 403/122 |
| 7,591,754 B2 | 9/2009 | Duong | |
| 7,600,940 B1 * | 10/2009 | Byrnes | F16C 11/0623 403/131 |
| 7,713,022 B2 | 5/2010 | Major et al. | |
| 7,824,305 B2 | 11/2010 | Duong | |
| 7,845,176 B2 | 12/2010 | Martin | |
| 7,861,535 B2 | 1/2011 | Figueroa et al. | |
| 7,926,260 B2 | 4/2011 | Sheridan et al. | |
| 8,202,043 B2 | 6/2012 | McCaffrey | |
| 8,205,432 B2 | 6/2012 | Sheridan | |
| 9,845,823 B1 * | 12/2017 | Yaworsky | B62D 7/166 |
| 2001/0024989 A1 | 9/2001 | Morse et al. | |
| 2004/0240759 A1 | 12/2004 | Swann et al. | |
| 2008/0236136 A1 | 10/2008 | Lofredo | |
| 2010/0104234 A1 | 4/2010 | Nuissl et al. | |
| 2014/0321904 A1 * | 10/2014 | Bao | F16M 13/00 403/132 |
| 2016/0025129 A1 * | 1/2016 | Parker | F16C 11/06 403/134 |

\* cited by examiner

LINKAGE WITH SPHERICAL OR JOURNAL BEARING ASSEMBLY

This application claims priority to PCT Patent Application No. PCT/US2013/021230 filed Jan. 11, 2013, which is hereby incorporated by reference.

BACKGROUND OF THE INVENTION

1. Technical Field

This disclosure relates generally to a linkage and, more particularly, to a linkage including a spherical and journal bearing assembly.

2. Background Information

A linkage typically connects together a plurality of components. Where one of the components may move or otherwise shift relative to another one of the components, the linkage may include a bearing to accommodate this movement. Various types and configurations of bearings are known in the art including spherical and journal bearings.

A typical spherical bearing includes a spherical bearing element swaged within a bearing housing. There is typically a clearance between the spherical bearing element and the bearing housing, which may allow the spherical bearing element to move (e.g., vibrate or rattle) within the bearing housing when the bearing is not loaded. Such movement may wear or otherwise damage engaging surfaces of the spherical bearing element and/or the bearing housing. When these surfaces have become worn or otherwise damaged, the spherical bearing is replaced.

There is a need in the art for a linkage with an improved bearing.

SUMMARY OF THE DISCLOSURE

According to an aspect of the invention, an assembly is provided that includes a spherical bearing race and a spherical bearing element. The bearing race includes a race first segment, a race second segment and a bore that extends along an axis into the bearing race. The bore also extends radially within the bearing race between the first segment and the second segment. The bearing element is arranged within the bore, and radially engages the first segment and the second segment.

According to another aspect of the invention, an assembly is provided that includes a bearing housing, a first bearing element, and a second bearing element. The first bearing element is arranged within the aperture. The first bearing element includes a first segment, a second segment and a bore that extends along an axis into the first bearing element. The bore also extends radially within the first bearing element between the first segment and the second segment. The second bearing element is arranged within the bore, and radially engages the first segment and the second segment.

The bearing race may include a parti-spherical first surface that at least partially defines the bore. The bearing element may include a parti-spherical second surface that engages the first surface. The first segment may include a circumferential first segment of the first surface. The second segment may include a circumferential second segment of the first surface.

The bore may extend axially through the bearing race. A second bore may extend through the bearing element.

The assembly may include a fastener that extends into the bore and is coupled to the bearing element.

The assembly may include a biasing element that biases the first segment against the bearing element. The biasing element may be configured as or include a spring.

The assembly may include a bearing housing that includes an aperture in which the bearing race and the bearing element are located.

The assembly may include an aperture cap that is connected to the bearing housing. The aperture may extend into the bearing housing to a housing surface. The bearing race and the bearing element may be arranged between the surface and the aperture cap.

The assembly may include a biasing element arranged between the bearing race and the surface. The assembly may also or alternatively include a biasing element arranged between the bearing race and the aperture cap.

One of the first and the second segments may include a first anti-rotation feature. The bearing housing may include a second anti-rotation feature that engages the first anti-rotation feature. The first and the second anti-rotation features may each be configured as a substantially planar surface.

The bearing housing may be configured as part of a linkage arm for a turbine engine component.

The first bearing element may include a parti-spherical first surface that at least partially defines the bore. The second bearing element may include a parti-spherical second surface that engages the first surface. The first segment may include a circumferential first segment of the first surface. The second segment may include a circumferential second segment of the first surface.

The first segment may be configured as a journal bearing that includes a second aperture. The second segment may be arranged within the second aperture. The second bearing element may be configured as or include a shaft that extends radially between the first segment and the second segment.

The system may include a biasing element arranged between the bearing housing and the first bearing element.

The system may include an aperture cap connected to the bearing housing. The system may also include a biasing element arranged between the first bearing element and the aperture cap.

The foregoing features and the operation of the invention will become more apparent in light of the following description and the accompanying drawings.

DETAILED DESCRIPTION OF THE INVENTION

FIGS. 1 to 4 illustrate a linkage 100 for connecting together a plurality of components. The linkage 100 may be configured as a structural member such as a strut and/or a movable member such as an actuator arm. The linkage 100 may be included in various types of devices such as, for example, a turbine engine, a rocket engine, an aircraft, a land vehicle, a marine vehicle, a robot, manufacturing equipment, etc. The linkage 100 includes a linkage body 102 and a spherical bearing assembly 104.

The linkage body 102 includes a bearing housing 106, an aperture cap 108, a retainer 110 (e.g., a lug) and a fastener 112 (e.g., a bolt). The bearing housing 106 includes a base 114 and a sidewall 116 (e.g., a tubular sidewall). The sidewall 116 extends longitudinally from the base 114 to a housing end 118.

The bearing housing 106 also includes one or more apertures including a race aperture 120, a biasing element aperture 122, one or more fastener apertures 124, and one or more retainer apertures 126. The race aperture 120 and the biasing element aperture 122 are defined by the sidewall 116. The race aperture 120 extends longitudinally into the bearing housing 106 from the housing end 118 to a housing surface 128 (e.g., an annular shelf). The race aperture 120 has a polygonal (e.g., substantially square or rectangular) cross-sectional geometry that is at least partially defined by one or more anti-rotation features 130 (e.g., substantially planar surfaces) of the sidewall 116. The biasing element aperture 122 extends longitudinally into the bearing housing 106 from the housing surface 128 and the race aperture 120 to a housing surface 132 of the base 114. The biasing element aperture 122 has a circular cross-sectional geometry that is at least partially defined by a substantially cylindrical surface of the sidewall 116. The fastener apertures 124 are arranged longitudinally between the housing surface 128 and the housing end 118. The fastener apertures 124 respectively extend laterally (e.g., along a y-axis) through opposing portions of the sidewall 116. The retainer apertures 126 are arranged longitudinally between the fastener apertures 124 and the housing end 118. The retainer apertures 126 respectively extend laterally through the opposing portions of the sidewall 116.

The bearing assembly 104 includes a first bearing element 134, a second bearing element 136 and a biasing element 138. The first bearing element 134 is configured as a split spherical bearing race. The first bearing element 134 includes a race first segment 140 (e.g., half) and a race second segment 142 (e.g., half) that is discrete from the first segment 140. The first segment 140 extends longitudinally between a first segment inner end 143 and a first segment outer end 144. The first segment 140 has a polygonal cross-sectional geometry that is at least partially defined by one or more anti-rotation features 146 (e.g., substantially planar surfaces) of the first segment 140. The second segment 142 extends longitudinally between a second segment inner end 148 and a second segment outer end 150. The second segment 142 has a polygonal cross-sectional geometry that is at least partially defined by one or more anti-rotation features 152 (e.g., substantially planar surfaces) of the second segment 142.

The first bearing element 134 also includes a bore 154 that extends laterally along an axis through (or partially into) the first bearing element 134. The bore 154 extends radially within the first bearing element 134 between the first segment 140 and the second segment 142. The bore 154 is at least partially defined by a substantially parti-spherical first surface of the first bearing element 134, which surface extends circumferentially around the axis. The first segment 140 includes a circumferential first segment 156 (e.g., half) of the first surface. The second segment 142 includes a circumferential second segment 158 (e.g., half) of the first surface. These first and second segments 156 and 158 of the first surface may each be coated with a hard coating such as a cermet coating (e.g., a tungsten carbide/cobalt coating), a chromium carbide/nickel chromium coating, an oxide ceramic coating (e.g., a chromium oxide or alumina coating), a fused self fluxing alloy coating (e.g., a NiCrSiB coating), an iron, nickel, chromium or cobalt alloy coating, or any other type of coating.

The second bearing element 136 is configured as a spherical bearing element. The second bearing element 136 extends radially out to a parti-spherical second surface 160, which extends circumferentially around the axis. This second surface 160 may be coated with a hard coating such as a cermet coating (e.g., a tungsten carbide/cobalt coating), a chromium carbide/nickel chromium coating, an oxide ceramic coating (e.g., a chromium oxide or alumina coating), a fused self fluxing alloy coating (e.g., a NiCrSiB coating), an iron, nickel, chromium or cobalt alloy coating, or any other type of coating. The second bearing element 136 includes a bore 161 that extends axially through (or partially into) the second bearing element 136.

The biasing element 138 extends longitudinally between a biasing element first end and a biasing element second end. The biasing element 138 is configured as a coil spring. Alternatively, the biasing element 138 may be configured as a rubber spring element, or any other type of spring element that can generate a biasing force between the first and the second ends.

During linkage 100 assembly, the biasing element 138 is arranged within the biasing element aperture 122, and engages (e.g., contacts) the housing surface 132. The first segment 140 is arranged within the race aperture 120. One or more of the anti-rotation features 146 respectively engage the anti-rotation features 130. The first segment outer end 144 engages the biasing element 138, and is longitudinally separated from the housing surface 128 by a gap. The second bearing element 136 is arranged within the race aperture 120. A first portion of the second surface 160 radially slidably engages the first segment 156 of the first surface. The second segment 142 is arranged within the race aperture 120. One or more of the anti-rotation features 152 respectively engage the anti-rotation features 130. The second segment 158 of the first surface radially slidably engages a second portion of the second surface 160. The second segment inner end 148 is longitudinally separated from the first segment inner end 143 by a gap. The retainer 110 is mated with the bearing housing 106. The retainer 110 extends laterally through the race aperture 120 and into (or through) the retainer apertures 126. The aperture cap 108 is mated with the bearing housing 106 at the housing end 118. The fastener 112 connects the aperture cap 108 to the retainer 110, which secures the aperture cap 108 and the retainer 110 to the bearing housing 106.

The linkage 100 may be connected to one or more components (not shown) with a fastener 162 (e.g., a bolt, a stud, a pin, etc.) or any other type of connector. The fastener 162 extends through (or into) the bores 154 and 161, which couples the fastener 162 to the second bearing element 136. The fastener 162 may be pivoted or swiveled about the axis, which may enable movement between the linkage 100 and the one or more components to which linkage 100 is connected. The biasing element 138 biases the first and the second segments 140 and 142 against the second bearing element 136, which may reduce or substantially prevent (e.g., longitudinal) movement of the second bearing element 136 within the bore 154.

When a device that includes the linkage 100 is being serviced or inspected, the bearing assembly 104 may also be inspected by disassembling the linkage 100. If any of the components of the linkage 100 are found to be worn or damaged, these worn components may be reconditioned and/or replaced and the linkage 100 may subsequently be re-assembled for further use in the device. In addition, a magnitude of the gap between the second segment inner end 148 and the first segment inner end 143 may be monitored with an electronic gap measurement device to determine how the first and/or the second bearing elements 134 and 136 are wearing. For example, where the gap is relatively small, the coating of first and/or the second bearing elements 134 and 136 may be relatively worn. Various electronic measurement devices are known in the art and therefore are not described in further detail.

Figure 5:
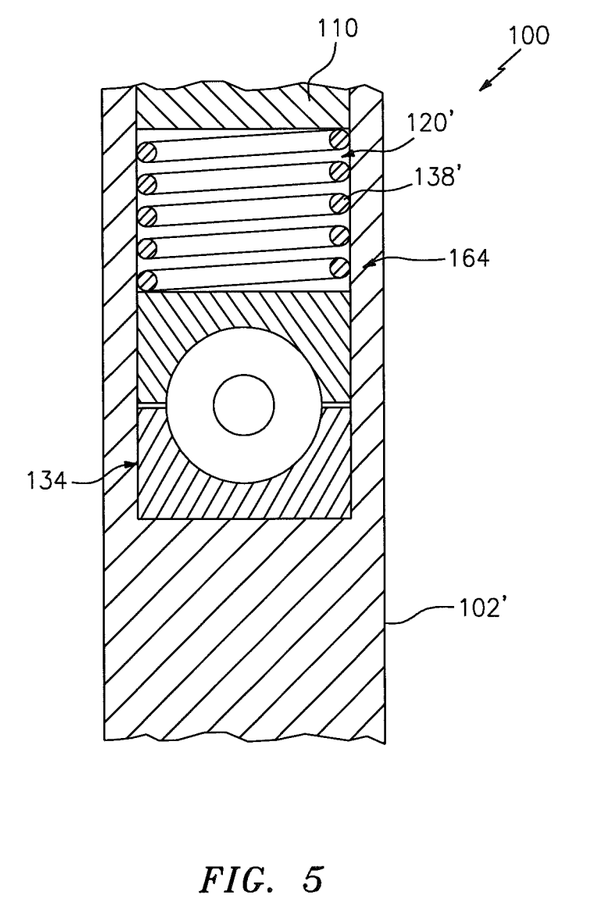
FIG. 5 is a partial sectional illustration of a linkage including another spherical bearing assembly.

FIG. 5 is a sectional illustration of the linkage 100 with another spherical bearing assembly 164. In contrast the bearing assembly 104 of FIGS. 1 to 4, the biasing element 138' is arranged within the race aperture 120' between the first bearing element 134 and the retainer 110. In addition, the linkage body 102' is configured without the biasing member aperture.

Figure 6:
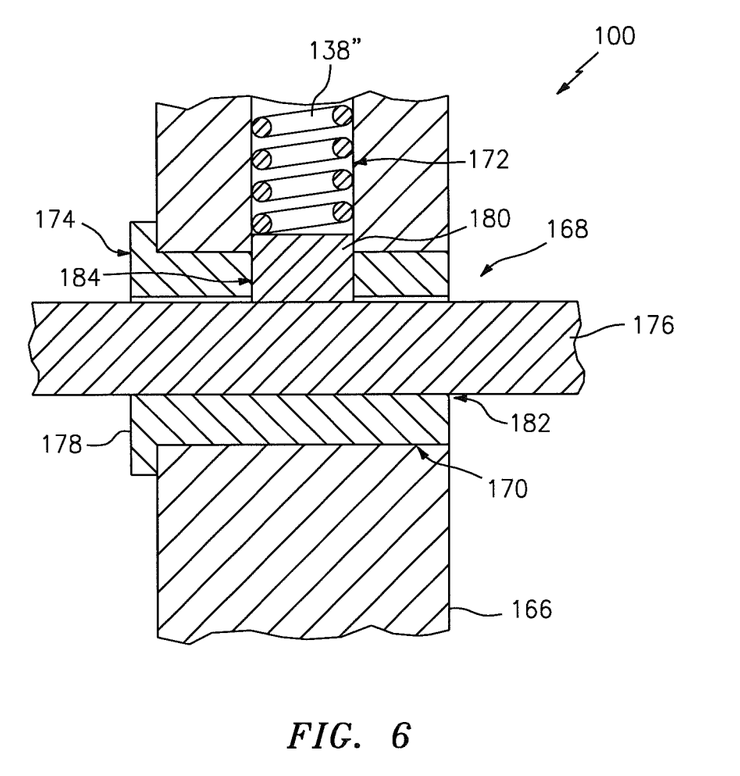
FIG. 6 is a partial sectional illustration of a linkage including a journal bearing assembly.

FIG. 6 is a sectional illustration of the linkage 100 with another linkage body 166 and a journal (e.g., plain) bearing assembly 168. The linkage body 166 includes a bearing element aperture 170 and a biasing element aperture 172. The bearing element aperture 170 extends laterally through the linkage body 166. The biasing element aperture 172 extends longitudinally into the linkage body 166 to the bearing element aperture 170. The bearing assembly 168 includes a first bearing element 174, a second bearing element 176 (e.g., a shaft) and a biasing member 138". The first bearing element 174 includes a first segment 178, a second segment 180 and a bore 182. The bore 182 extends laterally along an axis through (or into) the first bearing element 174. The first segment 178 is configured as a journal bearing such as a cylindrical bushing. The first segment 178 includes a sidewall that defines the bore 182, and an aperture 184. The aperture 184 extends through the sidewall to the bore 182. The second segment 180 is configured as a pin. The first segment 178 is arranged within the bearing element aperture 170. The second segment 180 is arranged in the aperture 184. The second segment 180 may extend longitudinally into the biasing element aperture 172, which laterally retains the first segment 178 within the bearing element aperture 170. The second bearing element 176 extends laterally through the bore 182, and radially slidably engages the first and the second segments 178 and 180. The biasing element 138" is arranged within the biasing element apertures 172, and biases the first and the second segments 178 and 180 against the second bearing element 176.

In some embodiments, the linkage body, the first bearing element and/or the second bearing element may be constructed from the same material; e.g., metal, polymer, etc. In other embodiments, the linkage body may be constructed from a different material than the first bearing element and/or the second bearing element.

The linkage 100 and the components of the linkage 100 may have various configurations other than those described above and illustrated in the drawings. For example, the race aperture and/or one or more of the first and the second segments may have non-polygonal (e.g., circular) cross-sectional geometries. One or more of the anti-rotation features may be configured as a keyway and another respective one of the features may be configured as a key that extends into the keyway. The aperture cap may be bonded (e.g., welded, brazed and/or otherwise adhered) to the bearing housing. The biasing element may be omitted, or the linkage may include a plurality of biasing elements. The linkage may include a shim for adjusting a biasing force exerted by the biasing element against the first bearing element. The present invention therefore is not limited to any particular linkage component types or configurations.

Figure 7:
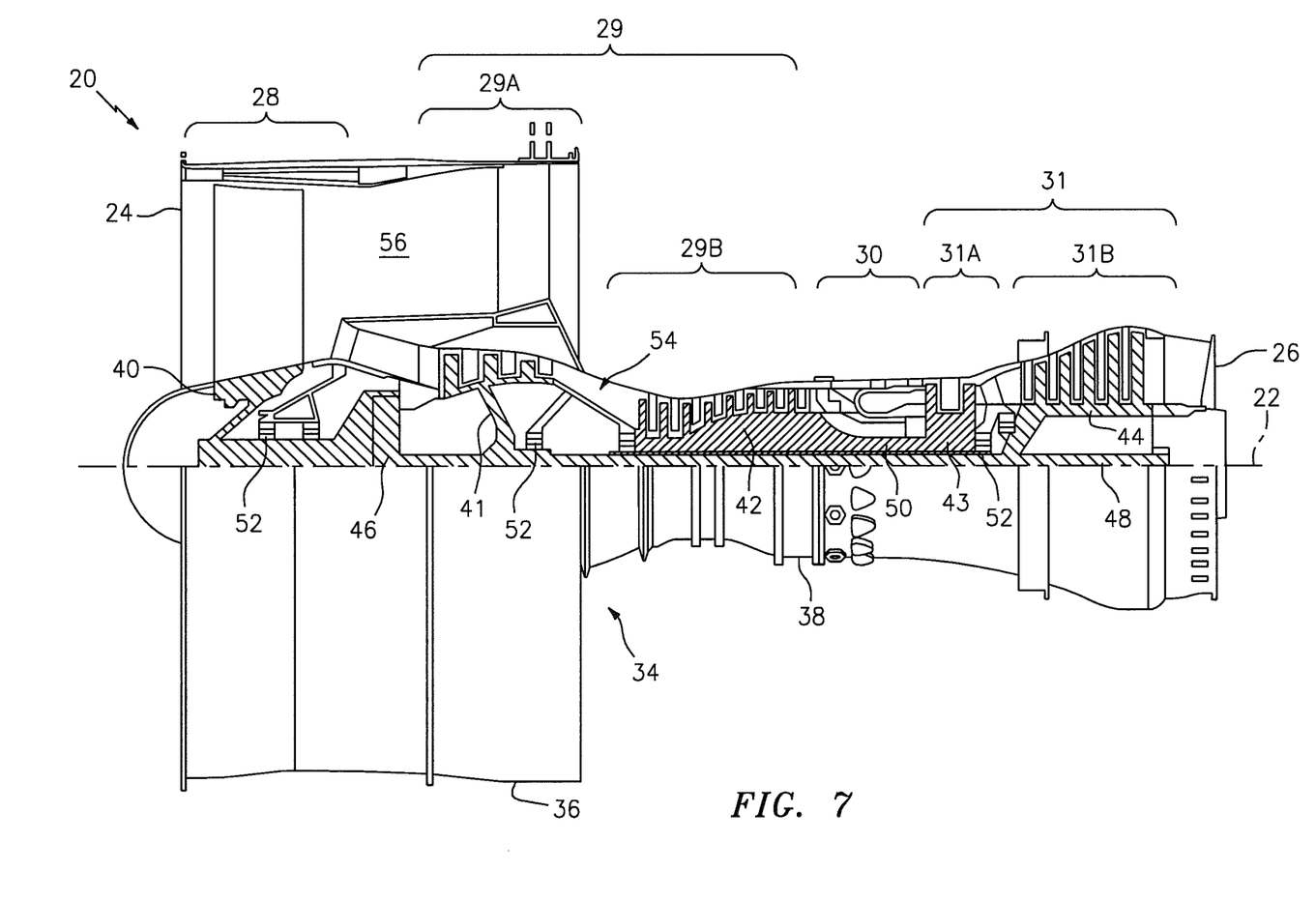
FIG. 7 is a side cutaway illustration of a geared turbine engine.

As described above, the linkage 100 may be included in various types of devices including a geared turbine engine 20 as illustrated in FIG. 7. The linkage 100 may be configured, for example, as actuator aim that connects an actuator to a variable stator vane, an exhaust nozzle flap, or any other movable turbine engine component. The linkage 100 may alternatively be configured as a static strut that transfers loads between a plurality of turbine engine components.

The engine 20 extends along an axis 22 between an upstream airflow inlet 24 and a downstream airflow exhaust 26. The engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B. The engine sections 28-31 are arranged sequentially along the axis 22 within an engine housing 34, which includes a first engine case 36 (e.g., a fan nacelle) and a second engine case 38 (e.g., a core nacelle).

Each of the engine sections 28, 29A, 29B, 31A and 31B includes a respective rotor 40-44. Each of the rotors 40-44 includes a plurality of rotor blades arranged circumferentially around and connected to (e.g., formed integral with or mechanically fastened, welded, brazed or otherwise adhered to) one or more respective rotor disks. The fan rotor 40 is connected to a gear train 46; e.g., an epicyclic gear train. The gear train 46 and the LPC rotor 41 are connected to and driven by the LPT rotor 44 through a low speed shaft 48. The HPC rotor 42 is connected to and driven by the HPT rotor 43 through a high speed shaft 50. The low and high speed shafts 48 and 50 are rotatably supported by a plurality of bearings 52. Each of the bearings 52 is connected to the second engine case 38 by at least one stator such as, for example, an annular support strut.

Air enters the engine 20 through the airflow inlet 24, and is directed through the fan section 28 and into an annular core gas path 54 and an annular bypass gas path 56. The air within the core gas path 54 may be referred to as "core air". The air within the bypass gas path 56 may be referred to as "bypass air" or "cooling air". The core air is directed through the engine sections 29-31 and exits the engine 20 through the airflow exhaust 26. Within the combustor section 30, fuel is injected into and mixed with the core air and ignited to provide forward engine thrust. The bypass air is directed through the bypass gas path 56 and out of the engine 20 to provide additional forward engine thrust or reverse thrust via a thrust reverser. The bypass air may also be utilized to cool various turbine engine components within one or more of the engine sections 29-31.

Figure 1:
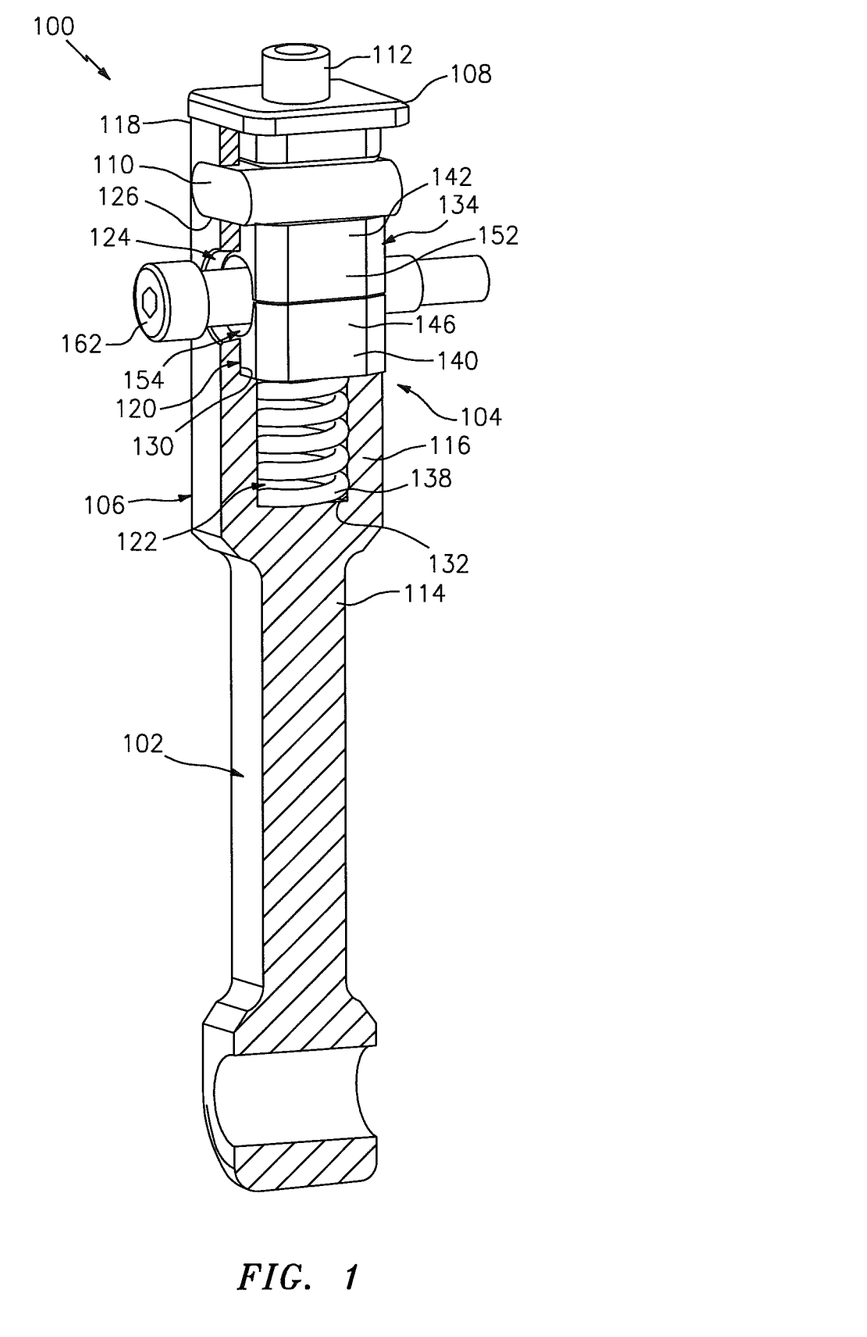
FIG. 1 is a perspective cutaway illustration of a linkage including a spherical bearing assembly.
Figure 2:
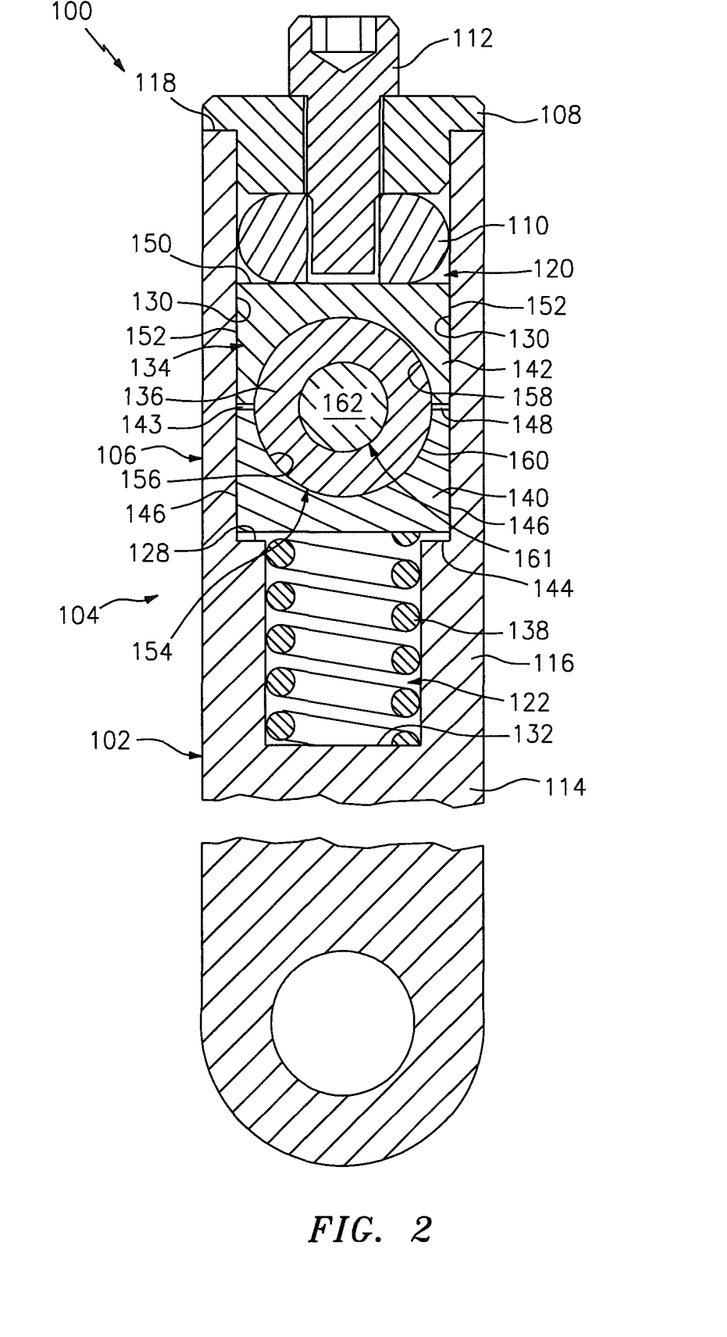
FIG. 2 is a sectional illustration of the linkage of FIG. 1.
Figure 3:
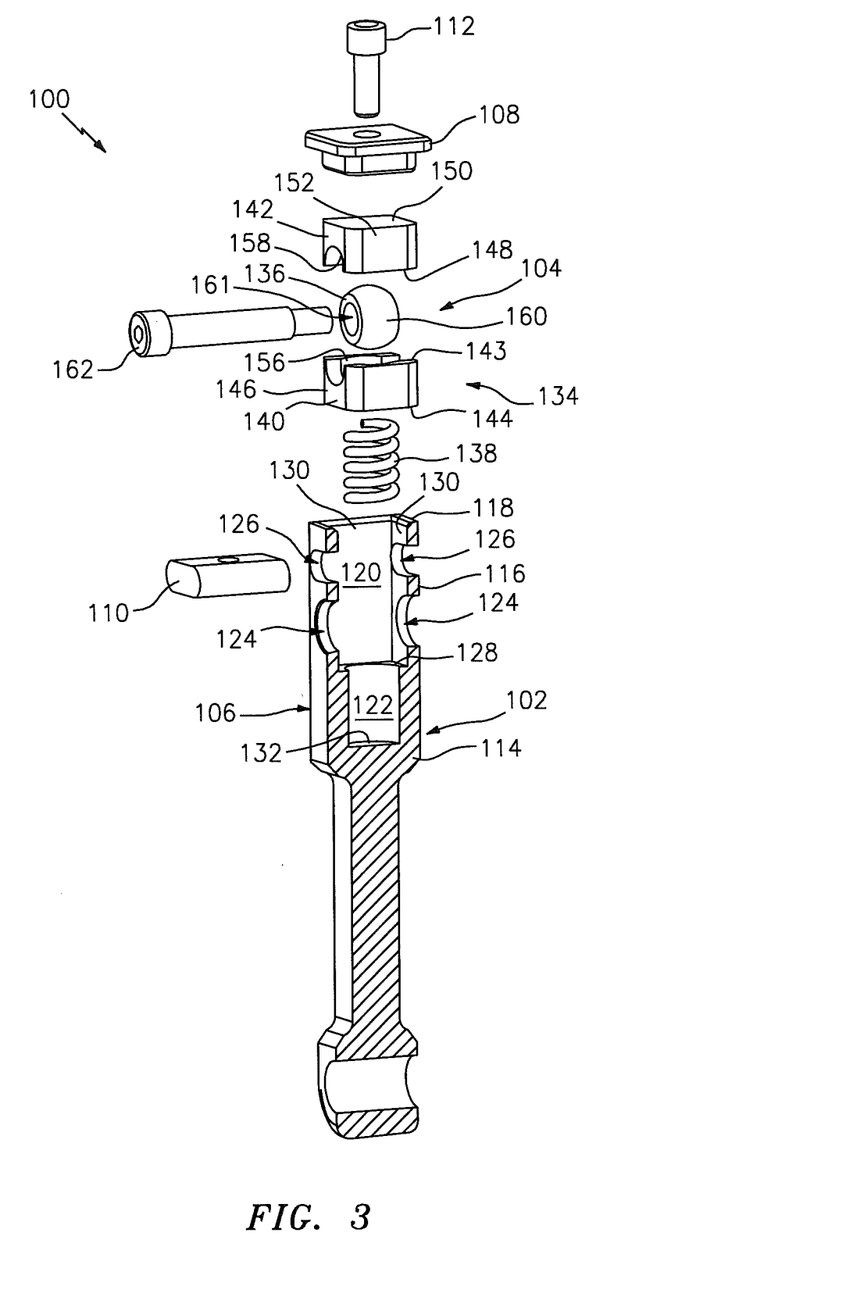
FIG. 3 is an exploded cutaway illustration of the linkage of FIG. 1.
Figure 4:
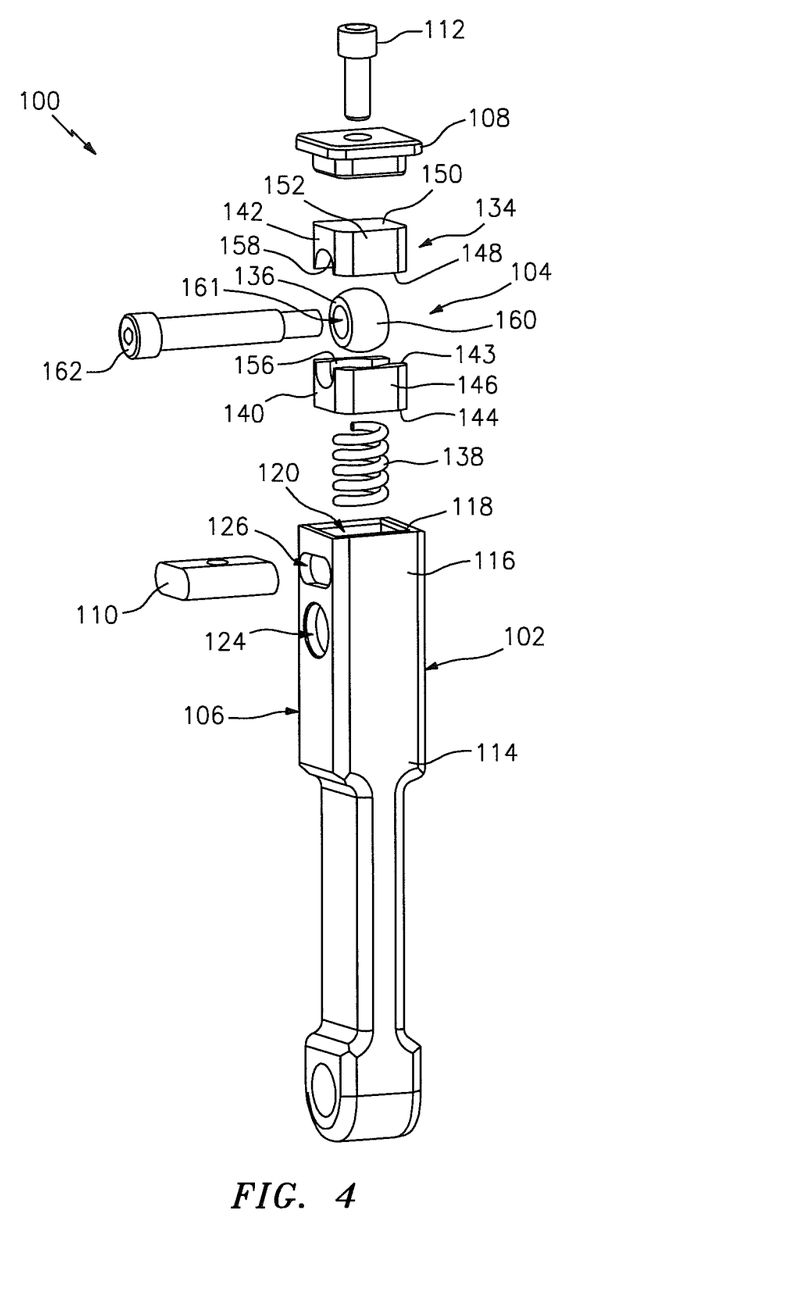
FIG. 4 is an exploded illustration of the linkage of FIG. 1.

A person of skill in the art will recognize the linkage 100 and the bearing assemblies 104, 164 and 168 may be included in various turbine engines other than the one described above as well as various other types of devices. The linkage, for example, may be included in a geared turbine engine where a gear train connects one or more shafts to one or more rotors in a fan section and/or a compressor section. Alternatively, the linkage may be included in a turbine engine configured without a gear train. The linkage may be included in a turbine engine configured with a single spool, with two spools as illustrated in FIG. 1, or with more than two spools. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. An assembly, comprising:
a bearing housing including an aperture;
a spherical bearing race in the aperture and including
a race first segment;
a race second segment; and
a bore extending along an axis into the bearing race, and extending radially within the bearing race between the first segment and the second segment; and
a spherical bearing element arranged within the bore, and radially engaging the first segment and the second segment; and
a fastener extending into the bore and coupled to the bearing element, the fastener projecting through a plurality of fastener apertures in a sidewall of the bearing housing.

2. The assembly of claim 1, wherein
the bearing race includes a parti-spherical first surface that at least partially defines the bore; and
the bearing element includes a parti-spherical second surface that engages the first surface.

3. The assembly of claim 2, wherein
the first segment includes a circumferential first segment of the first surface; and
the second segment includes a circumferential second segment of the first surface.

4. The assembly of claim 1, wherein
the bore extends axially through the bearing race; and
a second bore extends through the bearing element.

5. The assembly of claim 1, further comprising a biasing element that biases the first segment against the bearing element.

6. The assembly of claim 5, wherein the biasing element comprises a spring.

7. The assembly of claim 1, further comprising:
an aperture cap connected to the bearing housing;
wherein the aperture extends into the bearing housing to a housing surface; and
wherein the bearing race and the bearing element are arranged between the housing surface and the aperture cap.

8. The assembly of claim 7, further comprising a biasing element arranged between the bearing race and the housing surface.

9. The assembly of claim 7, further comprising a biasing element arranged between the bearing race and the aperture cap.

10. The assembly of claim 1, wherein one of the first and the second segments includes a first anti-rotation feature; and the bearing housing includes a second anti-rotation feature that engages the first anti-rotation feature.

11. The assembly of claim 10, wherein first and the second anti-rotation features are each configured as a substantially planar surface.

12. The assembly of claim 1, wherein the bearing housing is configured as part of a linkage arm for a turbine engine component.

13. An assembly, comprising:
a bearing housing including an aperture;
a first bearing element arranged within the aperture, and including
a first segment;
a second segment; and
a bore extending along an axis into the first bearing element, and extending radially within the first bearing element between the first segment and the second segment; and
a second bearing element arranged within the bore, and radially engaging the first segment and the second segment;
wherein a cylindrical body passes axially through the bore and through second apertures in a sidewall of the bearing housing.

14. The assembly of claim 13, wherein
the first bearing element includes a parti-spherical first surface that at least partially defines the bore; and
the second bearing element includes a parti-spherical second surface that engages the first surface.

15. The assembly of claim 14, wherein
the first segment includes a circumferential first segment of the first surface; and
the second segment includes a circumferential second segment of the first surface.

16. The assembly of claim 13, wherein
the first segment is configured as a journal bearing that includes a second aperture;
the second segment is arranged within the second aperture; and
the second bearing element comprises a shaft that extends radially between the first segment and the second segment, and the shaft comprises the cylindrical body.

17. The assembly of claim 13, further comprising a biasing element arranged between the bearing housing and the first bearing element.

18. The assembly of claim 13, further comprising:
an aperture cap connected to the bearing housing; and
a biasing element arranged between the first bearing element and the aperture cap.

19. The assembly of claim 13, wherein
the second bearing element comprises a spherical bearing element; and
the cylindrical body further passes axially through a bore of the spherical bearing element.

* * * * *